United States Patent [19]
Bjerrum et al.

[11] Patent Number: 5,344,722
[45] Date of Patent: Sep. 6, 1994

[54] PHOSPHORIC ACID FUEL CELL

[75] Inventors: Niels J. Bjerrum, Rådhusvej; Xiao Gang, Sankt Hans Gade; Hans A. Hjuler, Dronningvej; Christian Olsen, Plantagevej; Rolf W. Berg, Frenderupvej, all of Denmark

[73] Assignee: Haldor Topsoe A/S, Lyngby, Denmark

[21] Appl. No.: 903,903

[22] Filed: Jun. 25, 1992

[30] Foreign Application Priority Data

Jun. 28, 1991 [DK] Denmark .................... 1272/91

[51] Int. Cl.$^5$ ............................................ H01M 8/22
[52] U.S. Cl. ............................................ 429/46; 429/34
[58] Field of Search ........................................ 429/46

[56] References Cited

U.S. PATENT DOCUMENTS 4,639,401  1/1987  Jackovitz et al. ............... 429/30
4,780,954  11/1988  Kato ................................ 429/46

FOREIGN PATENT DOCUMENTS 9007513  7/1990  PCT Int'l Appl. .

OTHER PUBLICATIONS

*Chemical Abstract*, vol. 109 (14), 113411x. 1988.
*J. Electrochem. Soc. Electrochemical Science and Technology*, vol. 133 (11), pp. 2262–2267, Nov. 1986.

Primary Examiner—Stephen Kalafut
Assistant Examiner—M. Nuzzolillo
Attorney, Agent, or Firm—Ostrolenk, Faber, Gerb & Soffen

[57] ABSTRACT

A series of modified phosphoric acid electrolytes containing fluorinated carbon compounds and silicone fluids as additives are disclosed. The modified electrolytes can improve the fuel cell performance due to the enhanced oxygen reduction kinetics. These additives are, preferably, potassium perfluorohexanesulphonate ($C_6F_{13}KO_3S$), potassium nonafluorobutanesulphonate ($C_4F_9KO_3S$), perfluorotributylamine [$(C_4F_9)_3N$] and polymethylsiloxanes [$-Si(CH_3)_2O-)_n$]. The additives are added in an amount of 0.1–5 wt % with respect to the phosphoric acid electrolyte.

11 Claims, 3 Drawing Sheets

PHOSPHORIC ACID FUEL CELL

BACKGROUND OF THE INVENTION

1. Field of the Invention

The present invention is directed to phosphoric acid fuel cells, and more particularly, to a phosphoric acid fuel cell with an improved electrolyte, In a fuel cell, chemical energy of gaseous fuel is converted into electrical power. A conventional fuel cell comprises an anode, a cathode, and an electrolyte impregnated matrix disposed between the electrodes.

In the operation of a phosphoric acid fuel cell, a hydrogen containing gas is fed to the anode and an oxygen containing gas to the cathode. The gases diffuse through the electrodes and react with the electrolyte in the presence of a catalyst on the electrodes to yield water, heat and electrical energy.

At the anode, hydrogen in the feed gas gives up electrons by electrochemical oxidation reaction. The electrical current so generated is conducted from the anode through an external circuit to the cathode. At the cathode, the electrons are then electrochemically combined with oxygen. A flow of ions through the electrolyte completes the circuit.

The electrochemical reactions proceeding in a phosphoric acid fuel cell are thus:

$$H_2 \rightarrow 2H^+ + 2e^-$$

at the anode, and $$\tfrac{1}{2}O_2 + 2H^+ + 2e^- \rightarrow H_2O$$

at the cathode.

Phosphoric acid is the conventional electrolyte for acidic hydrogen-oxygen fuel cells because of its high stability at elevated temperatures, the ease of removal of $CO_2$ and water, and its high ionic conductivity. However, phosphoric acid has several undesirable properties. Its low oxygen solubility at high acid concentrations and relatively slow oxygen reduction rate lead to a very high polarization of the cathode.

2. Description of the Related Art

To enhance the oxygen reduction rate and thereby improve the efficiency of phosphoric acid fuel cells, it has been suggested to substitute trifluoromethanesulphonic acid for the phosphoric acid electrolyte in the cells.

The oxygen reduction rate in trifluoromethane-sulphonic acid is substantially higher than in phosphoric acid because of the higher oxygen solubility resulting in improved limiting current of the cell (R. C. Bhardway, N. G. Smart and J. O Bockris; Proc. Intersot. Energy Convers. Eng. Conf., 1991, Vol. 26, No. 3; pages 546–569; P. Zellenay, B. R. Scharifker and J. O. Bockris; J. Electrochem. Soc., 1986, Vol. 133, No. 11; pages 2262–2267).

Despite of its better performance, the use of trifluromethanesulphonic acid is limited to temperatures below the operation temperature of practical phosphoric acid fuel cells, because of its high vapour pressure. As a further disadvantage of trifluromethanesulphonic acid, it absorbs very easily in the porous electrodes resulting in low gas diffusion and thereby a higher electrode polarization.

SUMMARY OF THE INVENTION

We have now found that addition of small amounts of fluorinated organic compounds or silicone compound, having a vapour pressure not higher than that of phosphoric acid, to the phosphoric acid electrolyte of a phosphoric acid fuel cell enhances oxygen solubility and diffusitivity of the electrolyte without detrimental absorption of the electrolyte in the electrodes of the cell and thus improves the performance of conventional operated phosphoric acid fuel cells.

Accordingly, this invention provides a phosphoric acid fuel cell comprising within a housing a gas diffusion cathode utilizing an oxygen-containing oxidant gas, a gas diffusion anode using a hydrogen-containing fuel gas, and an electrolyte comprising phosphoric acid and at least 0.1 percent by weight of an additive selected from the group of fluorinated compounds and silicone compounds with a vapour pressure not higher than that of phosphoric acid, thereby decreasing polarization of the cathode and increasing efficiency of the cell.

As a theoretical explanation, the above electrolyte additives form a physically adsorbed layer on the electrode/electrolyte interface, in which layer the concentration of oxygen is higher than in the bulk phosphoric acid and, thereby, increases the rate of oxygen reduction on the cathode and thus the thermal efficiency of the cell.

BRIEF DESCRIPTION OF THE DRAWINGS

In the following examples, the invention will be illustrated in detail by reference to preferred embodiments thereof and to the drawings in which.

DETAILED DESCRIPTION OF THE PREFERRED EMBODIMENTS

A phosphoric acid fuel cell is disclosed having within a housing a gas diffusion cathode utilizing an oxygen-containing oxidant gas, a gas diffusion anode using a hydrogen-containing fuel gas, and an electrolyte. The electrolyte includes phosphoric acid and at least 0.1% by weight of an additive selected from the group of fluorinated compounds and silicone compounds with a vapor pressure not higher than that of phosphoric acid. The additive in the phosphoric acid decreases polarization of the cathode and increases the efficiency of the phosphoric acid fuel cell.

The additive may be a salt of nonafluorobutanesulphonate. Preferably, the salt of nonafluorobutanesulphonate is potassium nonafluorobutanesulphonate ($C_4F_9KO_3S$). Alternatively the additive may be a salt of perfluorohexanesulphonic acid. Preferably, the salt of perfluorohexanesulphonic acid is potassium perfluorohexanesulphonate ($C_6F_{13}KO_3S$). The additive may also be a perfluorinated trialkylamine having the general formula $R_1R_2R_3N$, or the salts thereof. $R_1$, $R_2$, and $R_3$ being independent fluorocarbon groups. Preferably, the perfluorinated trialkylamine is perfluorotributylamine $[(C_4F_9)_3N]$. Additionally, the additive may be a polyalkylsiloxane. Preferably, the polyalkylsiloxane is polymethylsiloxane $[(-Si(CH_3)_2O-)_n]$.

The invention provides a series of modified phosphoric acid electrolytes containing fluorinated carbon compounds and silicone fluids as additives. The modified electrolytes improve the fuel cell performance due to enhanced oxygen reduction kinetics. The additives may be added in an amount of 0.1 to 5 weight percent, preferably 0.1 weight percent, with respect to the phosphoric acid electrolyte.

In the Examples, the electrodes used were Pt-catalyzed carbon gas diffusion electrodes (0.5 mg/cm$^2$ Pt loading on both anode and cathode). All the experiments were carried out with 100% $H_3PO_4$ as electrolyte, at a temperature of 190° C., by using pure hydrogen as fuel and pure oxygen as oxidant.

The fuel cell housing used to test the electrolyte additives was a product from Giner, Inc. (General License GLV). The temperature was controlled by a controller (Dowty TC-48, Dowty Electronics Company) and heat was provided to the cell by two flexible electrical heaters glued one to each steel end plate of the housing. The temperature in the cell was maintained within ±1° C. To maintain the water balance in the cell, the fuel gas was passed through a saturator containing distilled water at 72° C.

EXAMPLE 1

Figure 1:
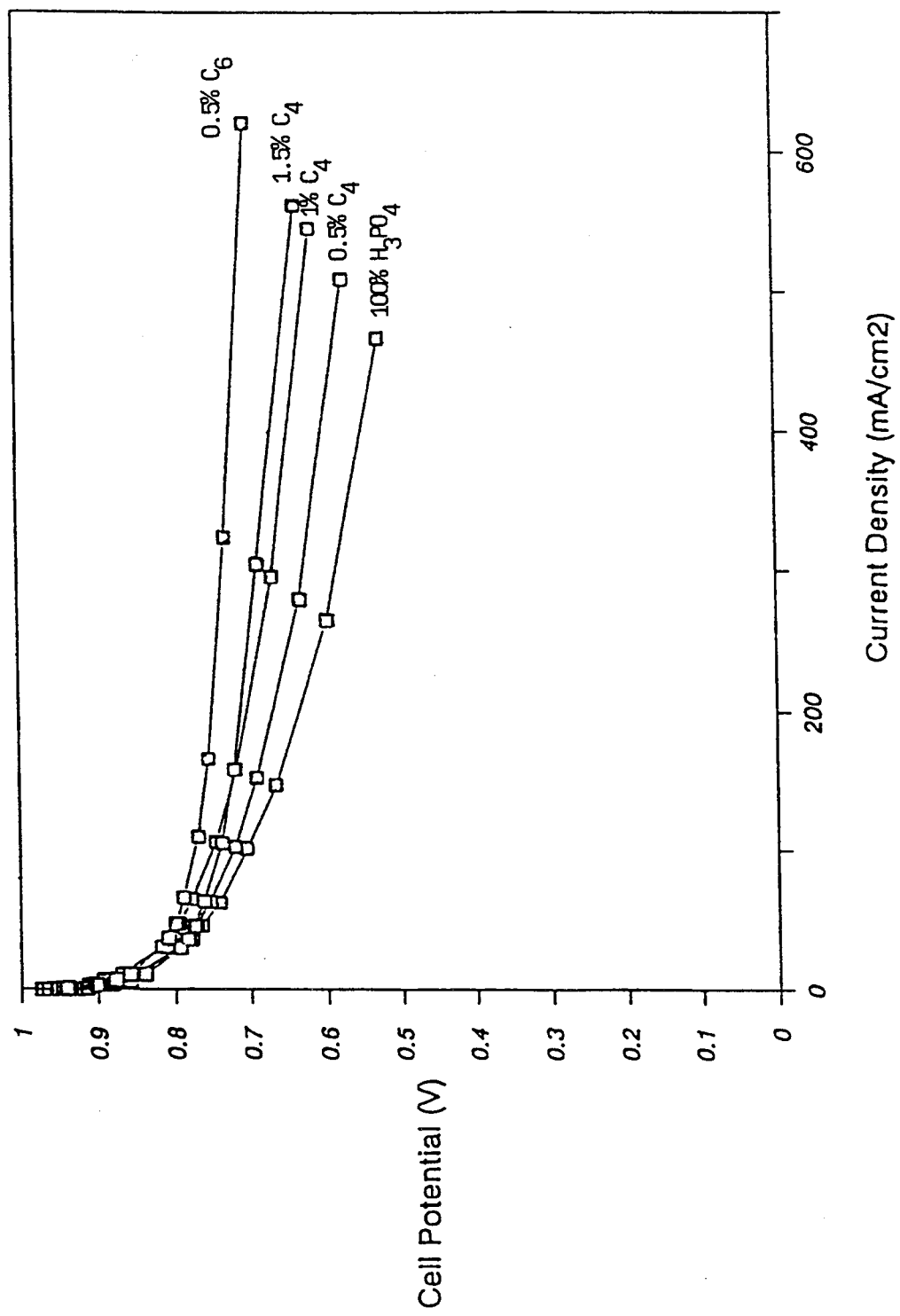
FIG. 1–FIG. 3 show cell polarization curves obtained with different electrolyte additives according to the invention in comparison with 100% phosphoric acid electrolyte.

In this Example, potassium perfluorohexanesulphonate ($C_6F_{13}KO_3S$; $C_6$) was used as electrolyte additive. $C_6F_{13}KO_3S$ is a white powder purchased from Riedel-de Haën (98% pure). Phosphoric acid (85%, Riedel-de Haën) was purified by treatment with hydrogen peroxide and concentrated to 100% by heating. A modified electrolyte was prepared by adding potassium perfluorohexanesulphonate to 100% phosphoric acid giving a weight ratio of 0.5:99.5, respectively. When agitated with a magnetic stirrer at about 100° C., a milk-white emulsion was achieved, which was used immediately as electrolyte. The cell test results are shown in FIG. 1.

EXAMPLE 2

Potassium nonafluorobutanesulphonate, ($C_4F_9KO_3S$; $C_4$) was used as electrolyte additive. $C_4F_9KO_3S$ is a white powder purchased from Aldrich Chemical Company, Inc. with 98% purity. 100% phosphoric acid was prepared as in Example 1. Modified electrolytes were prepared by adding potassium nonafluorobutanesulphonate to 100% phosphoric acid giving weight ratios of 0.5:99.5, 1.0:99.0 and 1.5:98.5, respectively. When agitated with a magnetic stirrer at about 100° C., milk-white emulsions were achieved which were used immediately as electrolytes in the tests. The cell test results are shown in FIG. 1.

EXAMPLE 3

Figure 2:
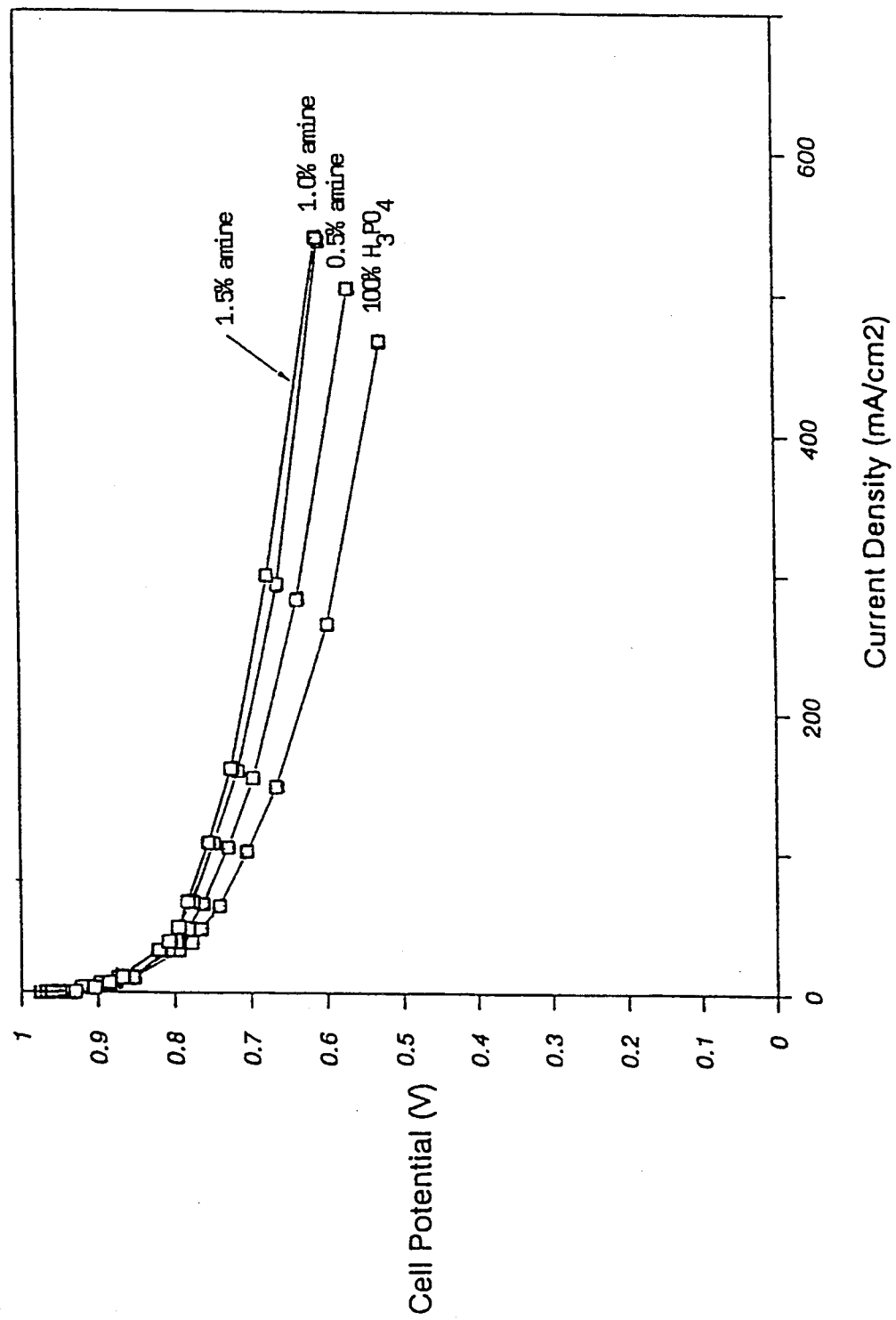

Perfluorotributylamine; [$(C_4F_9)_3N$; amine] was used as electrolyte additive. $(C_4F_9)_3N$ is a transparent liquid (technical grade) purchased from PCR Incorporated. 100% phosphoric acid was prepared according to Example 1. Modified electrolytes were prepared by adding perfluorotributylamine to 100% phosphoric acid giving weight ratios of 0.5:99.5, 1.0:99.0 and 1.5:98.5, respectively. When agitated with a magnetic stirrer at about 100° C., emulsions were achieved which were used immediately as electrolytes in the tests. The cell test results are shown in FIG. 2.

EXAMPLE 4

Figure 3:
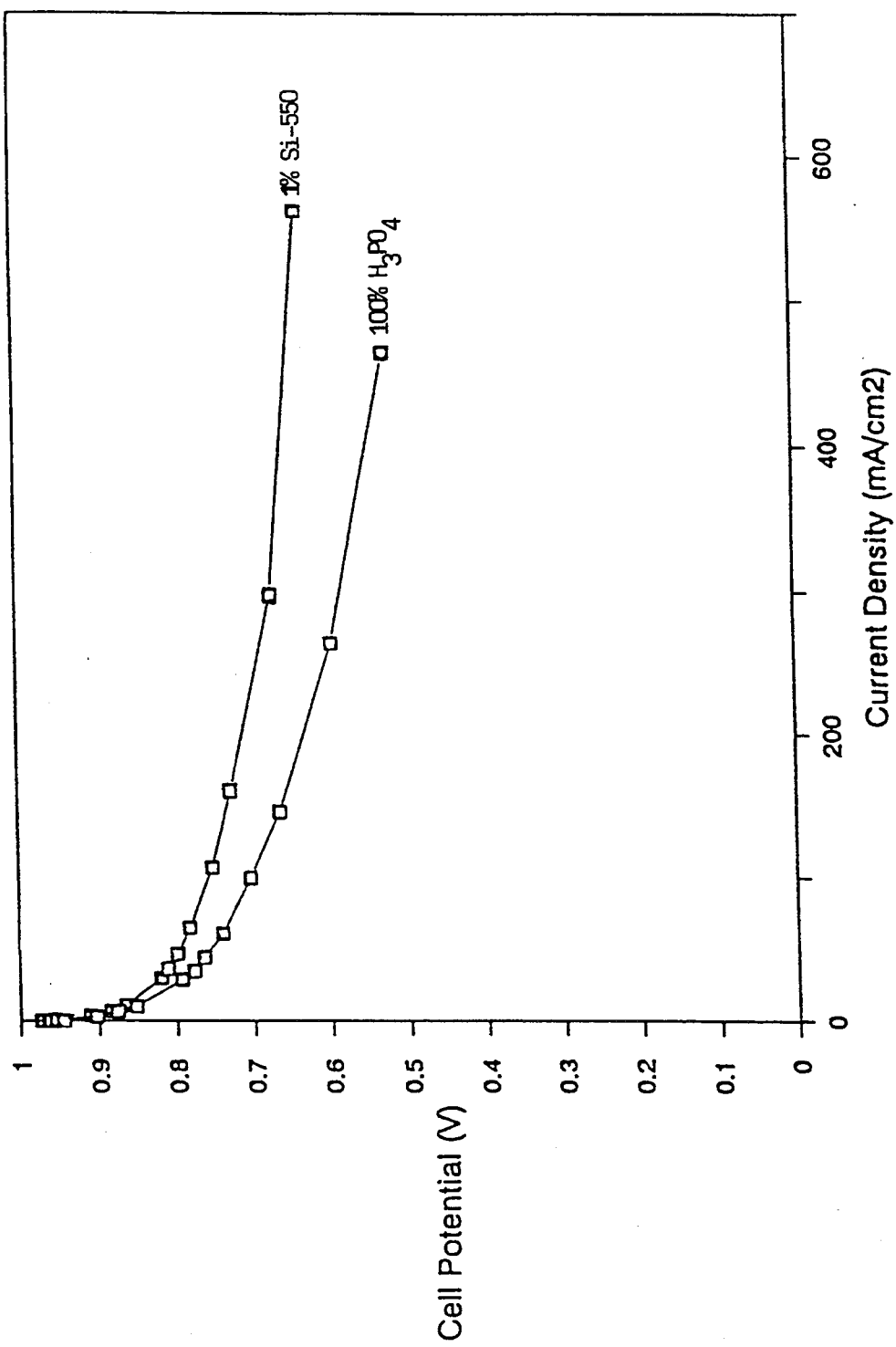

Silicone DC-550 (Si-550), [—$Si(CH_3)_2O$—]$_n$ was used as electrolyte additives. Silicone DC-550 is a transparent liquid purchased from Dow Co. 100% phosphoric acid was prepared according to Example 1. A modified electrolyte was prepared by adding silicone DC-550 to 100% phosphoric acid in a weight ratio of 1.0:99.0. When agitated with a magnetic stirrer at about 100° C., an emulsion was achieved, which was used immediately as electrolyte in the tests. The cell test results are shown in FIG. 3.

For a hydrogen-oxygen fuel cell operating at 190° C., $\Delta H$ is about $\div 280$ kJ/mole $H_2O$. It can be converted to a thermal voltage equivalent:

$$(280 \text{ kJ/mole})/2 \times 96.5 \text{ kA·s} = 1.45 \text{ V.}$$

Therefore, the thermal efficiency of a fuel cell is $V_{TERM}/1.45$, where $V_{TERM}$ is the cell terminal voltage.

According to FIGS. 1–3, at the same current density of 400 mA/cm$^2$, the cell thermal efficiencies can be calculated as follows:

When 100% $H_3PO_4$ was the electrolyte (as the reference), $$Eff_T = 0.54/1.45 = 37.2\%.$$

When 0.5% $C_6F_{13}KO_3S$ was used as the additive (Example 1), $$Eff_T = 0.72/1.45 = 49.7\%, (12.5\% \text{ increase in efficiency compared to } 100\% \text{ H}_3\text{PO}_4).$$

When 1.5% $C_4F_9KO_3S$ was used as the additive (Example 2), $$Eff_T = 0.67/1.45 = 46.2\%, (9.0\% \text{ increase in efficiency compared to } 100\% \text{ H}_3\text{PO}_4).$$

When 1.5% $(C_4F_9)_3N$ was used as the additive (Example 3), $$Eff_T = 0.65/1.45 = 44.8\%, (7.6\% \text{ increase in efficiency compared to } 100\% \text{ H}_3\text{PO}_4).$$

When 1.0% silicone DC-550 was used as the additive (Example 4), $$Eff_T = 0.66/1.45 = 45.5\%, (8.3\% \text{ increase in efficiency compared to } 100\% \text{ H}_3\text{PO}_4).$$

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

We claim:

1. A phosphoric acid fuel cell comprising within a housing a gas diffusion cathode utilizing an oxygen-containing oxidant gas, a gas diffusion anode using a hydrogen-containing fuel gas, and an electrolyte comprising phosphoric acid and at least 0.1 percent by weight of an additive selected from the group consisting of salts of nonafluoro-butane-sulphonic acid, salts of perfluoro-hexane-sulphonic acid, perfluorinated trialkyl amines having the general formula $R_1R_2R_3N$ and salts thereof wherein $R_1$, $R_2$ and $R_3$ are independent fluorocarbon groups.

2. The phosphoric acid fuel cell of claim 1, wherein the additive consists of a salt of nonafluorobutanesulphonate.

3. The phosphoric acid fuel cell of claim 2, wherein the salt of nonafluorobutanesulphonate is potassium nonafluorobutanesulphonate.

4. The phosphoric acid fuel cell of claim 1, wherein the additive consists of a salt of perfluorohexanesulphonic acid.

5. The phosphoric acid fuel cell of claim 4, wherein the salt of perfluorohexanesulphonic acid is potassium perfluorohexanesulphonate.

6. The phosphoric acid fuel cell of claim 1, wherein the additive is a perfluorinated trialkylamine having the general formula $R_1R_2R_3N$, or salts thereof, where $R_1$, $R_2$ and $R_3$ are independent fluorocarbon groups.

7. The phosphoric acid fuel cell of claim 6, wherein the perfluorinated trialkylamine is perfluorotributylamine.

8. The phosphoric acid fuel cell of claim 1, wherein the additive consists of a polyalkylsiloxane.

9. The phosphoric acid fuel cell of claim 8, wherein the polyalkylsiloxane is polymethylsiloxane.

10. A phosphoric acid fuel cell comprising within a housing a gas diffusion cathode utilizing an oxygen-containing oxidant gas, a gas diffusion anode using a hydrogen-containing fuel gas, and a liquid electrolyte comprising phosphoric acid and at least 0.1 percent by weight of an additive selected from the group consisting of fluorinated compounds and silicone compounds with a vapor pressure not higher than that of phosphoric acid, wherein the electrolyte is an emulsion of the phosphoric acid and the additive.

11. A phosphoric acid fuel cell comprising within a housing a gas diffusion cathode utilizing an oxygen-containing oxidant gas, a gas diffusion anode using a hydrogen-containing fuel gas, and an electrolyte consisting of phosphoric acid and at least 0.1 percent by weight of an additive selected from the group consisting of fluorinated compounds and silicone compounds with a vapor pressure not higher than that of phosphoric acid.

* * * * *